(12) United States Patent
Underbrink et al.

(10) Patent No.: US 7,269,511 B2
(45) Date of Patent: Sep. 11, 2007

(54) METHOD AND SYSTEM FOR DATA DETECTION IN A GLOBAL POSITIONING SYSTEM SATELLITE RECEIVER

(75) Inventors: Paul A. Underbrink, Lake Forest, CA (US); Steven A. Gronemeyer, Cedar Rapids, IA (US)

(73) Assignee: SIRF Technology, Inc., San Jose, CA (US)

( * ) Notice: Subject to any disclaimer, the term of this patent is extended or adjusted under 35 U.S.C. 154(b) by 68 days.

(21) Appl. No.: 11/176,022

(22) Filed: Jul. 6, 2005

(65) Prior Publication Data

US 2005/0264446 A1    Dec. 1, 2005

Related U.S. Application Data

(60) Division of application No. 10/792,143, filed on Mar. 3, 2004, now Pat. No. 6,961,660, which is a continuation of application No. 09/552,759, filed on Apr. 18, 2000, now Pat. No. 6,714,158.

(51) Int. Cl.
   *G01C 21/00* (2006.01)
(52) U.S. Cl. .................. 701/213; 701/35; 701/215; 342/357.12
(58) Field of Classification Search ............... 701/207, 701/213, 215, 35; 342/357.09, 357.12
   See application file for complete search history.

(56) References Cited

U.S. PATENT DOCUMENTS 3,604,911 A    9/1971    Schmitt
3,975,628 A    8/1976    Graves et al.
4,426,712 A    1/1984    Gorski-Popiel
4,445,118 A    4/1984    Taylor et al.

(Continued)

FOREIGN PATENT DOCUMENTS

EP    511741    11/1992

(Continued)

OTHER PUBLICATIONS

Telecommunications: Glossary of Telecommunication Terms, Federal Standard 1037C (Aug. 7, 1996).

(Continued)

*Primary Examiner*—Gertrude A. Jeanglaude
(74) *Attorney, Agent, or Firm*—Jonathan W. Hallman; MacPherson Kwok Chen & Heid LLP

(57) ABSTRACT

A data detection circuit within a global positioning system (GPS) satellite receiver operates to detect and decode data sent in a spread spectrum signal. The data detection circuit receives input from a radio receiver, the information containing data from a plurality of satellites. The data is supplied to a circular memory device, which determines which data corresponds to which satellite. The memory device sends the received signal to a matched filter, which decodes the signal received from each satellite. This signal is analyzed to determine whether a phase inversion due to data modulation on the received signal is present. The phase inversion can occur at boundaries, known as data epochs, in the received signal, and corresponds to data in the received signal. This data contains information relating to the position of each satellite and is collected by the data detection circuit for use by the GPS receiver.

8 Claims, 6 Drawing Sheets

U.S. PATENT DOCUMENTS

| | | |
|---|---|---|
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,894,842 A | 1/1990 | Broekhoven et al. |
| 4,992,720 A | 2/1991 | Hata |
| 4,998,111 A | 3/1991 | Ma et al. |
| 5,014,066 A | 5/1991 | Counselman, III |
| 5,018,088 A | 5/1991 | Higbie |
| 5,036,329 A | 7/1991 | Ando |
| 5,043,736 A | 8/1991 | Darnell et al. |
| 5,108,334 A | 4/1992 | Eschenbach et al. |
| 5,148,042 A | 9/1992 | Nakazoe |
| 5,153,591 A | 10/1992 | Clark |
| 5,179,724 A | 1/1993 | Lindoff |
| 5,202,829 A | 4/1993 | Geier |
| 5,225,842 A | 7/1993 | Brown et al. |
| 5,253,268 A | 10/1993 | Omura et al. |
| 5,276,765 A | 1/1994 | Freeman et al. |
| 5,293,170 A | 3/1994 | Lorenz et al. |
| 5,293,398 A | 3/1994 | Hamao et al. |
| 5,297,097 A | 3/1994 | Etoh et al. |
| 5,311,195 A | 5/1994 | Mathis et al. |
| 5,323,164 A | 6/1994 | Endo |
| 5,331,329 A | 7/1994 | Volkov et al. |
| 5,343,209 A | 8/1994 | Sennott et al. |
| 5,345,244 A | 9/1994 | Gildea et al. |
| 5,347,536 A | 9/1994 | Meehan |
| 5,352,970 A | 10/1994 | Armstrong, II |
| 5,363,030 A | 11/1994 | Ford et al. |
| 5,378,155 A | 1/1995 | Eldridge |
| 5,379,224 A | 1/1995 | Brown et al. |
| 5,396,515 A | 3/1995 | Dixon et al. |
| 5,402,346 A | 3/1995 | Lion et al. |
| 5,402,347 A | 3/1995 | McBurney et al. |
| 5,410,747 A | 4/1995 | Ohmagari et al. |
| 5,416,712 A | 5/1995 | Geier et al. |
| 5,418,818 A | 5/1995 | Marchetto et al. |
| 5,420,593 A | 5/1995 | Niles |
| 5,440,313 A | 8/1995 | Osterdock et al. |
| 5,450,344 A | 9/1995 | Woo et al. |
| 5,498,239 A | 3/1996 | Galel et al. |
| 5,504,684 A | 4/1996 | Lau et al. |
| 5,546,445 A | 8/1996 | Dennison et al. |
| 5,548,613 A | 8/1996 | Kaku et al. |
| 5,550,811 A | 8/1996 | Kaku et al. |
| 5,568,473 A | 10/1996 | Hemmati |
| 5,577,023 A | 11/1996 | Marum et al. |
| 5,577,025 A | 11/1996 | Skinner et al. |
| 5,592,173 A | 1/1997 | Lau et al. |
| 5,594,453 A | 1/1997 | Rodal et al. |
| 5,608,722 A | 3/1997 | Miller |
| 5,623,485 A | 4/1997 | Bi |
| 5,625,668 A | 4/1997 | Loomis et al. |
| 5,640,429 A | 6/1997 | Michels et al. |
| 5,640,431 A | 6/1997 | Bruckert et al. |
| 5,642,377 A | 6/1997 | Chung et al. |
| 5,644,591 A | 7/1997 | Sutton |
| 5,649,000 A | 7/1997 | Lee et al. |
| 5,650,792 A | 7/1997 | Moore et al. |
| 5,654,718 A | 8/1997 | Beason et al. |
| 5,663,734 A | 9/1997 | Krasner |
| 5,663,735 A | 9/1997 | Eshenbach |
| 5,689,814 A | 11/1997 | Hagisawa et al. |
| 5,722,061 A | 2/1998 | Hutchison, IV et al. |
| 5,734,674 A | 3/1998 | Fenton et al. |
| 5,734,966 A | 3/1998 | Farrer et al. |
| 5,737,329 A | 4/1998 | Horiguchi |
| 5,739,596 A | 4/1998 | Takizawa et al. |
| 5,749,067 A | 5/1998 | Barrett |
| 5,781,156 A | 7/1998 | Krasner |
| 5,784,695 A | 7/1998 | Upton et al. |
| 5,786,789 A | 7/1998 | Janky |
| 5,812,087 A | 9/1998 | Krasner |
| 5,825,327 A * | 10/1998 | Krasner ............... 342/357.09 |
| 5,828,694 A | 10/1998 | Schipper |
| 5,831,574 A | 11/1998 | Krasner |
| 5,832,021 A | 11/1998 | Kondo |
| 5,841,396 A | 11/1998 | Krasner |
| 5,845,203 A | 12/1998 | LaDue |
| 5,854,605 A | 12/1998 | Gildea |
| 5,862,465 A | 1/1999 | Ou |
| 5,867,535 A | 2/1999 | Phillips et al. |
| 5,867,795 A | 2/1999 | Novis et al. |
| 5,872,540 A | 2/1999 | Casabona et al. |
| 5,874,914 A | 2/1999 | Krasner |
| 5,877,724 A | 3/1999 | Davis |
| 5,877,725 A | 3/1999 | Kalafus |
| 5,881,371 A | 3/1999 | Reynolds |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,809 A | 5/1999 | Molnar et al. |
| 5,909,640 A | 6/1999 | Farrer et al. |
| 5,917,444 A | 6/1999 | Loomis et al. |
| 5,917,829 A | 6/1999 | Hertz et al. |
| 5,920,283 A | 7/1999 | Shaheen et al. |
| 5,923,703 A | 7/1999 | Pon et al. |
| 5,924,024 A | 7/1999 | Ikeda et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,956,328 A | 9/1999 | Sato |
| 5,963,582 A | 10/1999 | Stansell, Jr. |
| 5,970,084 A | 10/1999 | Honda |
| 5,977,909 A | 11/1999 | Harrison et al. |
| 5,982,324 A | 11/1999 | Watters et al. |
| 5,987,016 A | 11/1999 | He |
| 5,991,309 A | 11/1999 | Jensen et al. |
| 5,991,613 A | 11/1999 | Euscher et al. |
| 5,995,537 A | 11/1999 | Kondo |
| 5,999,124 A | 12/1999 | Sheynblat |
| 6,002,362 A | 12/1999 | Gudat |
| 6,002,363 A | 12/1999 | Krasner |
| 6,002,709 A | 12/1999 | Hendrickson |
| 6,009,551 A | 12/1999 | Sheynblat |
| 6,016,119 A | 1/2000 | Krasner |
| 6,023,462 A | 2/2000 | Nieczyporowicz et al. |
| 6,041,222 A | 3/2000 | Horton et al. |
| 6,047,016 A | 4/2000 | Ramberg et al. |
| 6,047,017 A | 4/2000 | Cahn et al. |
| 6,049,715 A | 4/2000 | Willhoff et al. |
| 6,052,081 A | 4/2000 | Krasner |
| 6,061,018 A | 5/2000 | Sheynblat |
| 6,064,336 A | 5/2000 | Krasner |
| 6,064,688 A | 5/2000 | Yanagi |
| 6,075,809 A | 6/2000 | Naruse |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |

| | | | |
|---|---|---|---|
| 6,133,873 A | 10/2000 | Krasner | |
| 6,133,874 A | 10/2000 | Krasner | |
| 6,150,980 A | 11/2000 | Krasner | |
| 6,850,557 B1 * | 2/2005 | Gronemeyer | ............... 375/150 |

FOREIGN PATENT DOCUMENTS

| | | |
|---|---|---|
| EP | 639901 | 2/1995 |
| JP | 08/065205 | 3/1996 |
| WO | WO92/13392 | 8/1992 |
| WO | WO 00/19644 | 4/2000 |

OTHER PUBLICATIONS

Fundamentals of Signal Tracking Theory, J.J. Spilker Jr., in Global Positioning System: Theory and Applications, vol. 1, edited by B.W. Parkinson et al., American Institute of Aeronautics and Astronautics, Inc., Washington, DC, p. 255, 1996.

D. J. R. Van Nee and A. J. R. M. Coenen, "New Fast GPS Code-Acquistion Technique Using FFT," Jan. 17, 1991, Electronics Letters, vol. 27, No. 2.

* cited by examiner

METHOD AND SYSTEM FOR DATA DETECTION IN A GLOBAL POSITIONING SYSTEM SATELLITE RECEIVER

CROSS REFERENCE TO RELATED APPLICATIONS

The present application is a division of U.S. patent application Ser. No. 10/792,143 filed on Mar. 3, 2004, now U.S. Pat. No. 6,961,660, incorporated herein by reference, which is a continuation of U.S. patent application Ser. No. 09/552,759, filed on Apr. 18, 2000 (now U.S. Pat. No. 6,714,158).

FIELD OF THE INVENTION

This invention relates generally to a global positioning system (GPS), and, more particularly, to a method and system for detecting data superimposed over a spread spectrum signal received from a GPS satellite.

BACKGROUND OF THE INVENTION

The U.S. based NAVSTAR global positioning system (GPS) is a collection of 24 earth-orbiting satellites. Each of the GPS satellites travels in a precise orbit about 11,000 miles above the earth's surface. A GPS receiver locks onto at least three of the satellites, and responsive thereto, is able to determine its precise location. Each satellite transmits a signal modulated with a unique pseudo-noise (PN) code. Each PN code comprises a sequence of 1023 chips which are repeated every millisecond consistent with a chip rate of 1.023 MHz. Each satellite transmits at the same frequency. For civil applications, the frequency is known as L1 and is 1575.42 MHz. The GPS receiver receives a signal which is a mixture of the transmissions of the satellites that are visible to the receiver. The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then uses the shifted PN code to achieve synchronization with subsequent transmissions from the satellite.

The receiver determines its distance from the satellite by determining the code phase of the transmission from the satellite. The code phase (CP) is the delay, in terms of chips or fractions of chips, that a satellite transmission experiences as it travels the approximately 11,000 mile distance from the satellite to the receiver determines the code phase for a particular satellite by correlating shifted versions of the satellite's PN code with the received signal after correction for Doppler shift. The code phase for the satellite is determined to be the shift which maximizes the degree of correlation with the received signal.

The receiver converts the code phase for a satellite to a time delay. It determines the distance to the satellite by multiplying the time delay by the velocity of the transmission from the satellite. The receiver also knows the precise orbits of each of the satellites. Updates to the locations of the satellites are transmitted to the receiver by each of the satellites. This is accomplished by modulating a low frequency (50 Hz) data signal onto the PN code transmission from the satellite. The data signal encodes the positional information for the satellite. The receiver uses this information to define a sphere around the satellite at which the receiver must be located, with the radius of the sphere equal to the distance the receiver has determined from the code phase. The receiver performs this process for at least three satellites. The receiver derives its precise location from the points of intersection between the at least three spheres it has defined.

The Doppler shift (DS) is a frequency shift in the satellite transmission caused by relative movement between the satellite and the receiver along the line-of-sight (LOS). It can be shown that the frequency shift is equal to $v_{LOS}/\lambda$, where $v_{LOS}$ is the velocity of the relative movement between the satellite and receiver along the LOS, and $\lambda$ is the wavelength of the transmission. The Doppler shift is positive if the receiver and satellite are moving towards one another along the LOS, and is negative if the receiver and satellite are moving away from one another along the LOS.

The Doppler shift alters the perceived code phase of a satellite transmission from its actual value. Hence, the GPS receiver must correct the satellite transmissions for Doppler shift before it attempts to determine the code phase for the satellite through correlation analysis.

The detection of the above-mentioned signals from each satellite can be accomplished in accordance with that disclosed in, for example, but not limited to, U.S. patent application entitled "SIGNAL DETECTOR EMPLOYING COHERENT INTEGRATION", having Ser. No. 09/281,566, and filed on Mar. 30, 1999. A signal detector as disclosed therein uses a correlation mechanism, for example, a matched filter, and a coherent integration scheme in which to detect the appropriate satellite signals.

Once the above-mentioned satellite signals are detected, then it is desirable to decode the low frequency 50 Hz data that is modulated onto the PN code signal received from the satellite. In the past, this data detection was performed using circuitry similar to that used to detect the transmission from the satellite. Unfortunately, this prior art scheme must run continually, thus consuming valuable processor resources.

Therefore, it would be desirable to have a data detection scheme that can make use of the satellite acquisition circuitry contained within the above-referenced U.S. patent application Ser. No. 09/281,566, and which can be operated for a limited duty cycle in order to conserve processor resources.

SUMMARY OF THE INVENTION

The invention provides a system and method for detecting data in a GPS receiver. The invention may be conceptualized as a method for a global positioning system (GPS) receiver, comprising the steps of decoding data encoded upon a spread spectrum modulated signal received from the GPS using a matched filter residing within the receiver. The data is demarcated into successive data epochs, whereby the periodic phase shift data encoded upon the signal by phase shifts of the data epochs is decoded using the matched filter.

Architecturally, the invention can be conceptualized as a system for a global positioning system (GPS), having a receiver, including data detection circuitry configured to decode data encoded upon a spread spectrum modulated signal received from the GPS using a matched filter residing within the receiver. The data is demarcated into successive data epochs, where the matched filter decodes periodic phase shift data encoded upon the signal by phase shifts of the data epochs.

The data detection circuitry receives the spread spectrum modulated signal in the form of a data stream and detects whether or not a phase inversion due to data modulation occurs at each data epoch within the data stream. The circuitry uses circular buffering and a matched filter to determine the location of the data epoch with respect to each satellite's received signal. The matched filter is used to collect data bits when the GPS receiver is in data detection mode, and is used to perform coherent integration from one data epoch to the next in order to accumulate coherently the energy contained in one data bit from a specific satellite. A plurality of successive coherent integration periods from two satellites are supplied to a complex summation memory device, that provides a signal corresponding to each of the integration periods. The two integration periods are then analyzed to determine whether a phase inversion has occurred at the data epoch.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the invention.

DETAILED DESCRIPTION OF THE PREFERRED EMBODIMENT

The data detection circuitry of the invention can be implemented in software, hardware, or a combination thereof. In a preferred embodiment(s), selected portions of the data detection circuit are implemented in hardware and software. The hardware portion of the invention can be implemented using specialized hardware logic. The software portion can be stored in a memory and be executed by a suitable instruction execution system (microprocessor). The hardware implementation of the data detection circuit can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the data detection circuitry software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, in the context of this document a "global positioning system", or "GPS", means any system utilizing satellites and/or land-based communications devices for providing or enabling the determination of a location on the earth, for example, but not limited to, NAVSTAR, GLONASS, LORAN, Shoran, Decca, or TACAN.

Figure 1:
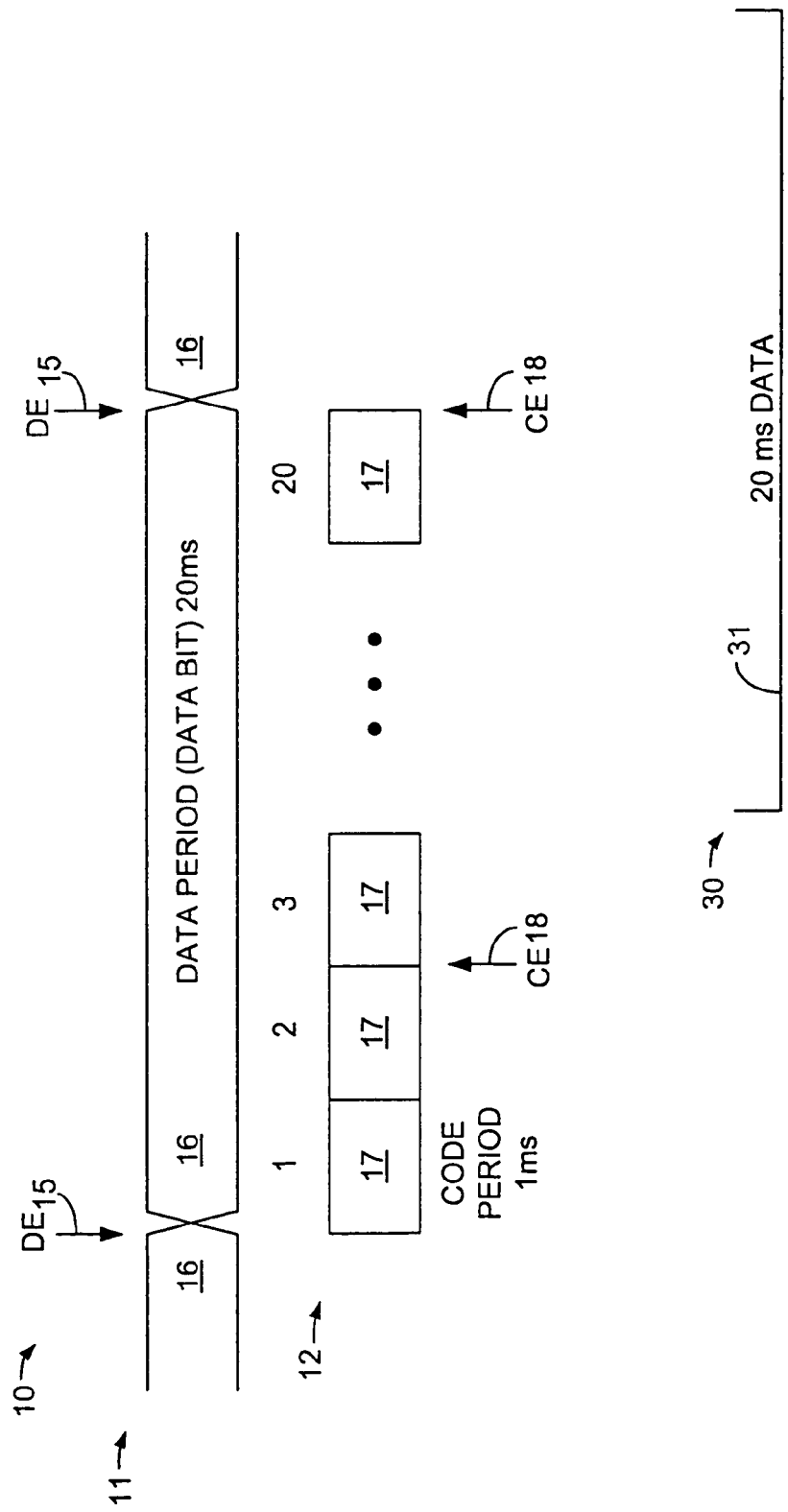
FIG. 1 is a graphical illustration of the information contained in a satellite waveform as received by the data detection circuit of the invention.

Turning now to the drawings, FIG. 1 is a graphical illustration of the information contained in a satellite waveform as received by the data detection circuit of the invention. Satellite waveform 10 includes data stream 11 and code stream 12. The data stream 11 is comprised of 20 milliseconds (ms) of data, within a data period 16, which includes 20 one-millisecond code periods 17. Twenty one-millisecond code periods 17 comprise one data period 16. Each code period 17 includes 1023 pseudo-random noise (PN) chips, which are used by a satellite acquisition circuit similar to the data detection circuit 100 (to be illustrated below with respect to FIG. 2) while operating in a satellite acquisition mode. During the satellite acquisition mode, the PN chips received from the satellite in the code periods 17 are compared against ideal values of the PN chips by a satellite acquisition circuit in order to determine which satellite, or satellites, is visible to the GPS receiver.

The information contained within data period 16 is transmitted at 50 Hz and includes ephemeris data for each satellite and almanac data for all satellites in the GPS system. The almanac data and the ephemeris data are similar in that they both are useful to the GPS receiver for locating the position of the satellite, and will both be described in greater detail below. This low frequency 50 Hz data is modulated over the carrier frequency and over the spread spectrum signal, which includes the code stream 12. Each twenty millisecond data period 16 contains one data bit and is separated from an adjoining data period 16 by an event known as a data epoch. Each code period 17 is separated by an event called a code epoch 18 at the boundary of each code period. A code epoch 18 will coincide with each data epoch 15. Each data epoch 15 also corresponds with every twentieth code period 17. In other words, each data epoch 15 has an associated code epoch 18, but each code epoch 18 does not necessarily have an associated data epoch 15. Each data epoch 15 possibly includes a phase inversion due to the data modulation that is applied over the carrier and the spread spectrum transmission. Because each data period 16 corresponds to one data bit, data stream 11 includes a phase inversion at a data epoch 15 when the information carried in the data stream changes state from a logic one to a logic zero and from a logic zero to a logic one. The communication protocol uses these code inversions to communicate the low frequency (50 Hz) data in data stream 11. In accordance with an aspect of the invention, any code inversions that occur at a data epoch 15 will be detected by the data detection circuit to be described below.

It is important to recognize that the satellite waveform 10 shown in FIG. 1 includes data from one of a plurality of satellites that will be transmitting similar information in similar satellite waveforms to be received by a GPS receiver.

FIG. 1 also shows timeline 30, which includes a twenty millisecond period 31 over which satellite waveforms from a plurality of satellites will be received by a GPS receiver. Timeline 30 is shown offset with respect to a data epoch 15 of data stream 11 to illustrate the concept that twenty millisecond period 31 will include parts of at least two data periods 16 for each satellite. This corresponds to between twenty and twenty-one code periods 17 received from each satellite. Twenty millisecond period 31 includes the satellite energy from all satellites that are visible to the GPS receiver. Importantly, the data epoch 15 that is included every twenty milliseconds in data stream 11, when taken with respect to twenty millisecond period 31 will be offset from the data epoch 15 received from each other satellite. This is so because each satellite will be at a different range and position relative to the GPS receiver. Because of this difference from each satellite, each satellite waveform 10 received by the GPS receiver will be arriving at a different time relative to each other satellite waveform received. It would be highly unlikely to receive one data bit (one data bit corresponds to one data period 16) from each satellite and have that precise twenty millisecond data period 16 appear within twenty millisecond period 31. It is more likely that twenty millisecond period 31 will include some portion of two data bits, or data periods, for each satellite. In accordance with an aspect of the invention, it is desirable to detect whether or not a phase inversion due to data modulation occurs at each data epoch 15 within data stream 11.

Figure 2:
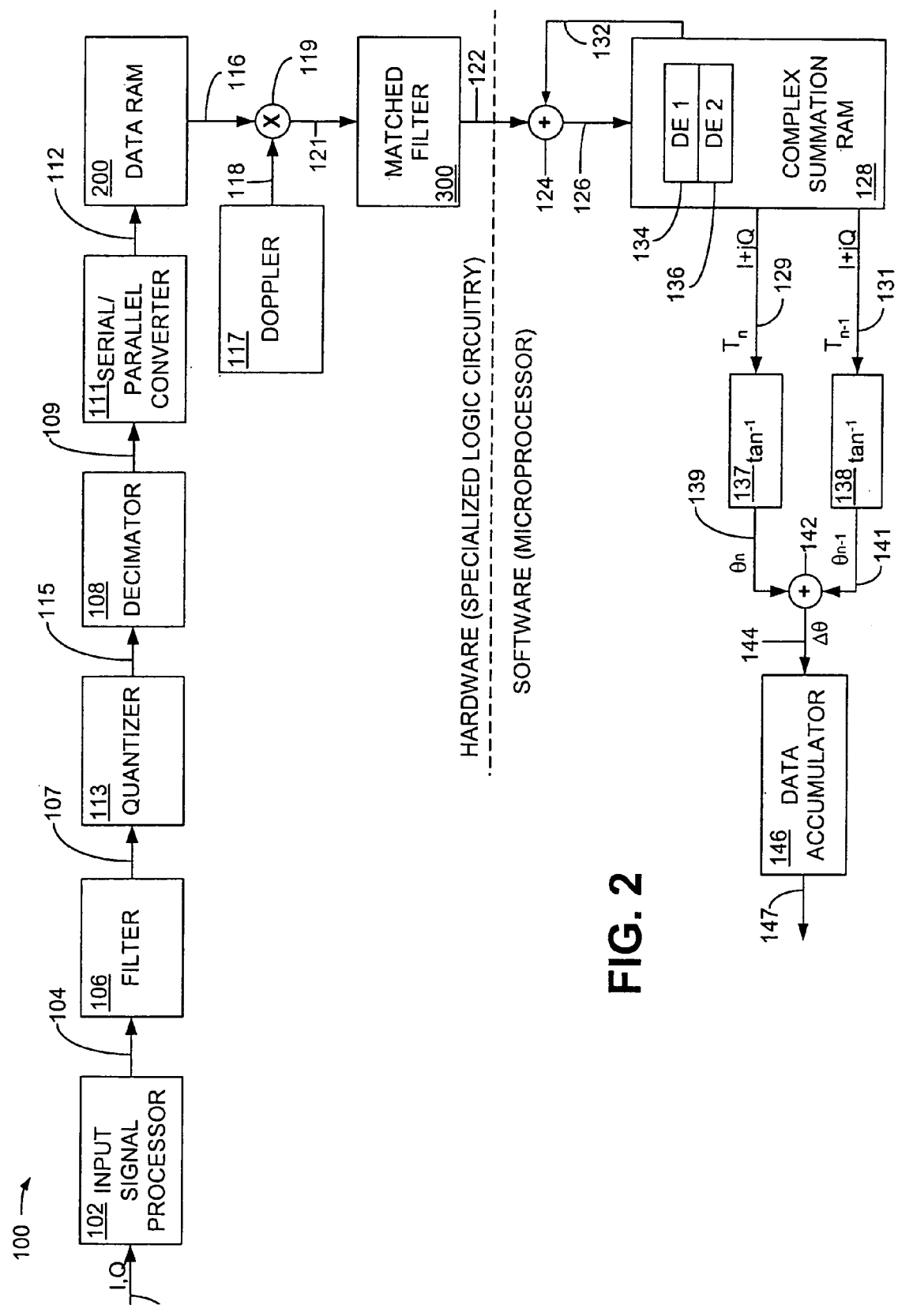
FIG. 2 is a block diagram illustrating the data detection circuit of the invention.

FIG. 2 is a block diagram illustrating the data detection circuit 100 of the invention. Data detection circuit 100 resides within, and is part of, a GPS satellite receiver that has visibility to a number of GPS satellites. Typically, a GPS receiver will have visibility to as many as 12 satellites, but typically, has visibility to 7-9 GPS satellites. The GPS receiver simultaneously receives signals from all the satellites visible to it and processes the signals in accordance with the invention.

An input signal containing the in-phase and quadrature components of the signal including the information contained in satellite waveform 10 of FIG. 1, is input via connection 101 to input signal processor 102. Input signal processor 102, in addition to other signal processing functions, removes the intermediate carrier frequency from the input signal on connection 101. The intermediate carrier frequency is typically at a frequency of $F_0/8$. Input signal processor 102 removes the 1.2 MHz intermediate carrier frequency from the signal on connection 101. Input signal processor 102 also attempts to remove any known offset errors in the local oscillator. Essentially, the input signal on connection 101 represents the radio frequency energy received by the radio processing circuitry (not shown) within the GPS receiver and supplied to data detection circuit 100.

The output of input signal processor 102 includes the spectra from all the visible satellites (i.e. represented by the signal on connection 101) with their average Doppler effect shifted to zero. In other words, some of the satellite energy represented in connection 101 has an effective frequency offset that is negative and some has an effective frequency offset that is positive. The signal on connection 104 includes $2F_0$, or about twenty million, samples of data periods 15 (FIG. 1) received from all visible satellites. The signal on connection 104 is then supplied to filter 106. Filter 106 is a sliding window filter and provides filtering prior to quantization and decimation. A band limiting filter can be used because input signal processor 102 has shifted the spectra of all the received satellite waveforms to near zero instead of near the intermediate carrier frequency of $F_0/8$. $F_0$ equals 10.23 MHz, therefore $F_0/8$ is approximately 1.2 MHz. Filter 106 functions as a sliding block average filter, which adds up about twenty samples for each window. The output of filter 106 over connection 107 is input to quantizer 113.

Quantizer 113 re-quantizes the output of filter 106 to four bit samples comprising two bits for the real part and two bits for the imaginary part of the signal on connection 107. The quantization at this point can alternatively output more bits per sample. Increasing the word width (number of bits) reduces the implementation loss of the system at the expense of requiring more storage for the samples. The output of quantizer 113 is input via connection 115 to decimator 108.

Decimator 108 decimates the signal on connection 107 at a ratio of approximately 10:1. In this manner, the sampling rate drops from approximately 20 MHz (the input to filter 106) to approximately 2 MHz (the output of decimator 108 on connection 109). The output of decimator 108 is $F_0/5$. The output of decimator 108 via connection 109 are four-bit data words, still representing the energy from all satellites visible to the GPS receiver. The four bit samples on connection 109 typically include two bits for the imaginary part of the data and two bits for the real part of the data.

The signal on connection 109 is then supplied to serial/parallel converter 111. Serial/parallel converter 111 organizes the four bit samples on connection 109 into a format compatible with the word length of data RAM 200. Data RAM 200 will be explained in further detail with respect to FIG. 3, however, no matter how the word inputs are arranged to data RAM 200, serial/parallel converter 111 will appropriately segment the four bit samples on connection 109 for input to data RAM 200 via connection 112. Although the description of the data detection circuit is not yet complete, the data RAM 200 will now be described.

Figure 3:
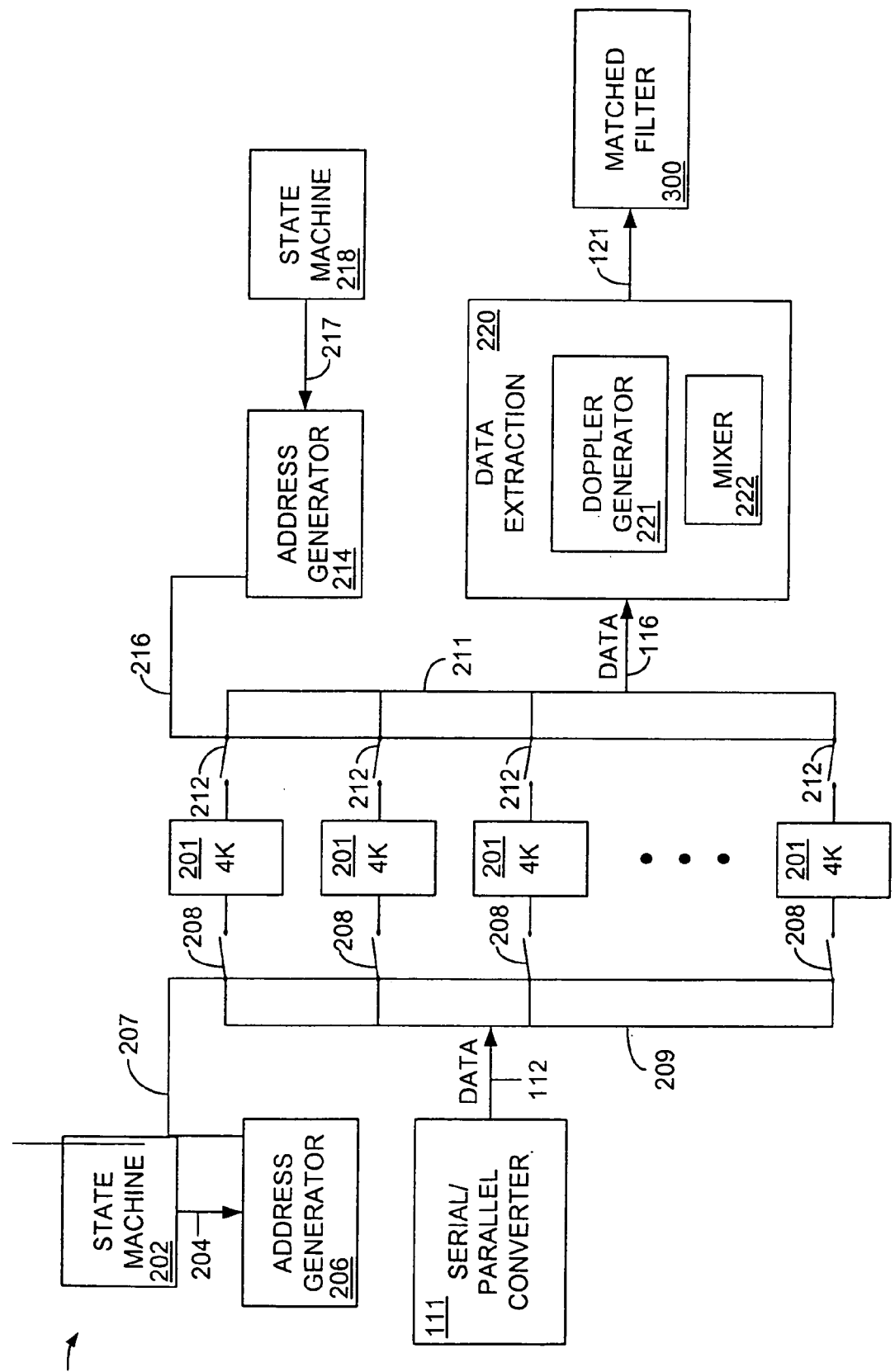
FIG. 3 is a block diagram illustrating the architecture of the data RAM of FIG. 2.

FIG. 3 is a block diagram illustrating the architecture of the data RAM 200 of FIG. 2. Data RAM 200 receives the four bit samples that have been structured to fit the word length of data RAM 200 by serial/parallel converter 111 (FIG. 2) via connection 112. The four bit samples have been organized by serial/parallel converter 111 into a word size appropriate for the memory elements that are used within data RAM 200. These word sizes will vary depending upon the RAM chosen. It should be noted that various memory elements and architectures could be used.

The signal containing the data from the plurality of received satellite waveforms is supplied over connection 112 to data bus 209. Data bus 209 supplies the data to memory elements 201 in accordance with instructions received from address generator 206. Memory elements 201 are, in this embodiment, 4K blocks of random access memory. The passage of data from data bus 209 to each memory element 201 is controlled by a switch 208, associated with each memory element 201 and connected along address bus 207. Each switch 208 is controlled by address generator 206. Address generator 206 determines the proper time at which each switch 208 will open and close, thereby allowing the passage of the data from data bus 209 into the appropriate memory element 201. State machine 202 controls the operation of address generator 206 via connection 204. State machine 202 determines the appropriate memory element 201 into which to load the data samples. Memory elements 201 are arranged in a circular buffer arrangement so that while a given memory element 201 is being loaded with data via data bus 209, the remainder of the memory elements cannot be loaded. Also, while a particular memory element 201 is being loaded, a different memory element 201 can be accessed via the operation of switches 212. Switches 212 are associated with each memory element 201 and are controlled by address generator 214 via address bus 216, in similar manner to the control of switches 208 on address bus 207. For example, while a memory element 201 is being loaded by data 112 via data bus 209, a different memory element 201 will be accessed via data bus 211 and switches 212. In this manner, data can continually be read into data RAM 200 and read out of data RAM 200. Address generator 214 is controlled by state machine 218 via connection 217. State machine 218 operates using the same logic as state machine 212 so that the operation of input and output to memory elements 201 can be coordinated.

The signal on connection 112 still represents satellite energy received from a plurality of satellites. In other words, the signal contained on connection 112 includes many twenty millisecond samples from a plurality of satellites. Because the data bits from one satellite are offset from the data bits of another satellite, data RAM 200 should be able to hold more than twenty milliseconds of data. This is so because the portion of one satellite's twenty milliseconds worth of data will be different from the portion of another satellite's twenty milliseconds worth of data in any particular memory element 201. In this manner, the size of each memory element 201 and the number of memory elements 201 should be chosen so that a sufficient amount of data from all satellites can be contained therein. The size of each memory element 201 and the quantity thereof can be determined based on specific application. In general, double buffering of the data from each satellite will require more than 60 ms of data and more than three memory elements 201. It is also feasible to organize the data in RAM 200 on the basis of smaller portions of input data samples, such as the code period (17 in FIG. 1). In such an event, double buffering of each satellite's signal samples would require more than 3 ms of data and more than three memory elements 201. This strategy ensures that at least one complete segment (e.g., 20 ms (data period) or 1 ms (code period)) of any satellite's data can be accessed from the set of memory elements 201 that exclude the one currently being loaded with input data. The lower limits of four segments and four buffers arises because Doppler shift could allow a data segment to occupy more than one buffer if the buffer were sized at exactly the nominal segment length.

In accordance with an aspect of the invention, address generator 206 and address generator 214, based upon inputs from state machine 202 and state machine 218, respectively, coordinate the input, processing and output of the data supplied on connection 112. Address generator 206 and state machine 202 sequentially store the data on connection 112 in the memory elements 201, in a continuous, circular addressing mode, while the address generator 214 and state machine 218 read data out of memory elements 201 in a similar fashion.

The output of data bus 211 is input via connection 116 to data extraction element 220. Data extraction element 220 extracts the bits of information contained within the signal on connection 116 for each subject satellite under analysis from each RAM word. This is so because there are samples from more than one satellite in each RAM word. The data present on connection 116 still includes satellite waveforms from a plurality of satellites, the signals of which are received by the GPS receiver.

In accordance with an aspect of the invention, address generator 214 will select a particular switch 212 via address bus 216 so that the appropriate memory element 201 can supply its contents via data bus 211 over connection 116 to the data extraction element 220. The data extraction element 220 works in cooperation with the state machine 218 and the address generator 214. The state machine 218, as mentioned above, provides to the address generator 214 the location, within data RAM 200, of the data epoch 15 for a given satellite's data period 16 (FIG. 1). The state machine 218 will instruct the address generator 214 via connection 217 as to which satellite's signal is being analyzed at a particular time. The state machine 218 provides the address generator 214 with the address at which to start counting, therefore allowing address generator 214 to know which memory element 201 to access to get a particular satellite's signal. Furthermore, because a given satellite's signal may be spread across more than one memory element 201, more than one memory element 201 may be accessed. In this manner, the data extraction element 220, at any particular time, will be supplied with address location information for a particular satellite signal. The data extraction element 220 supplies bit samples to matched filter 300 via connection 212. Matched filter 300 is illustrated broadly with respect to FIG. 2, and in further detail with respect to FIG. 4.

Data extraction element 220 also includes Doppler generator 221 and mixer 222. Doppler generator 221 supplies information regarding the Doppler shift that is specific to the particular satellite waveform being analyzed at any given time. Mixer 222 mixes the Doppler generator information with the information bit stream arriving on connection 116. In this manner, the signal supplied via connection 121 to matched filter 300 is a shifted spectrum of the desired satellite so that the signal is centered substantially near zero Hz.

Returning now to FIG. 2, the output of data RAM 200 on connection 116 is supplied to mixer 119. Doppler generator 117 supplies the Doppler shift mentioned above via connection 118 to mixer 119 and works similarly to Doppler generator 221 and mixer 222 mentioned above with respect to FIG. 3. Although shown schematically in FIG. 2 as a separate Doppler generator 117 and mixer 119, in a preferred embodiment, the data extraction element 220 of FIG. 3 could include this functionality. The output of mixer 119 is then supplied via connection 121 to matched filter 300. Matched filter 300 will be described in further detail with respect to FIG. 4.

Briefly, the matched filter 300 is used to make range measurements when the GPS receiver is in satellite acquisition mode, and is used to collect data bits when the GPS receiver is in data detection mode. When the GPS receiver is operating in a satellite acquisition mode, matched filter 300 is used to compare PN chips (FIG. 1) received from all satellites with ideal, or reference, PN chips generated by a code generator. The code generator generates reference PN chips that are identical to those received from the satellite. In this manner, the matched filter 300, while operating in satellite acquisition mode, can determine which satellite signal is being received. This is accomplished by computing the correlation between the PN chip samples received from data RAM 200 with the reference PN chips generated by the code generator. This is done for all the different cyclical shifts of the PN code for one period. An example of the architecture and operation of such a data acquisition circuit is more fully described in the above-identified U.S. patent application entitled "SIGNAL DETECTOR EMPLOYING COHERENT INTEGRATION", having Ser. No. 09/281,566, filed on Mar. 30, 1999, and hereby incorporated in this document by reference. In addition, an example of the architecture and operation of a Doppler corrected spread spectrum matched filter is more fully described in U.S. patent application entitled "DOPPLER CORRECTED SPREAD SPECTRUM MATCHED FILTER", having Ser. No. 09/145,055, filed on Sep. 1, 1998, and hereby incorporated in this document by reference.

In accordance with an aspect of the invention, when used in data detection circuit 100, matched filter 300 need not examine all the different code phases supplied from each different satellite because only the data periods 16, and in particular the data epochs 15 separating the code periods, are of interest. In accordance with an aspect of the invention, matched filter 300 will perform coherent integration from one data epoch 15 to the next. It is desirable to accumulate coherently the energy from one twenty millisecond data bit (see FIG. 1) from a specific satellite. In accordance with this aspect of the invention, and referring back to FIG. 3, state machine 218 and address generator 214 accurately estimate the points at which to begin and end accessing data from memory elements 201 for each satellite waveform's data epoch boundary. In this manner, the memory elements 201 are accessed many times, with the starting read-out point depending upon where the data epoch boundary is estimated to be for each satellite. In this manner, the matched filter need only operate in data acquisition mode for a brief period, on the order of 18 seconds, each hour. This limited duty cycle results in significant processor resource savings.

Figure 4:
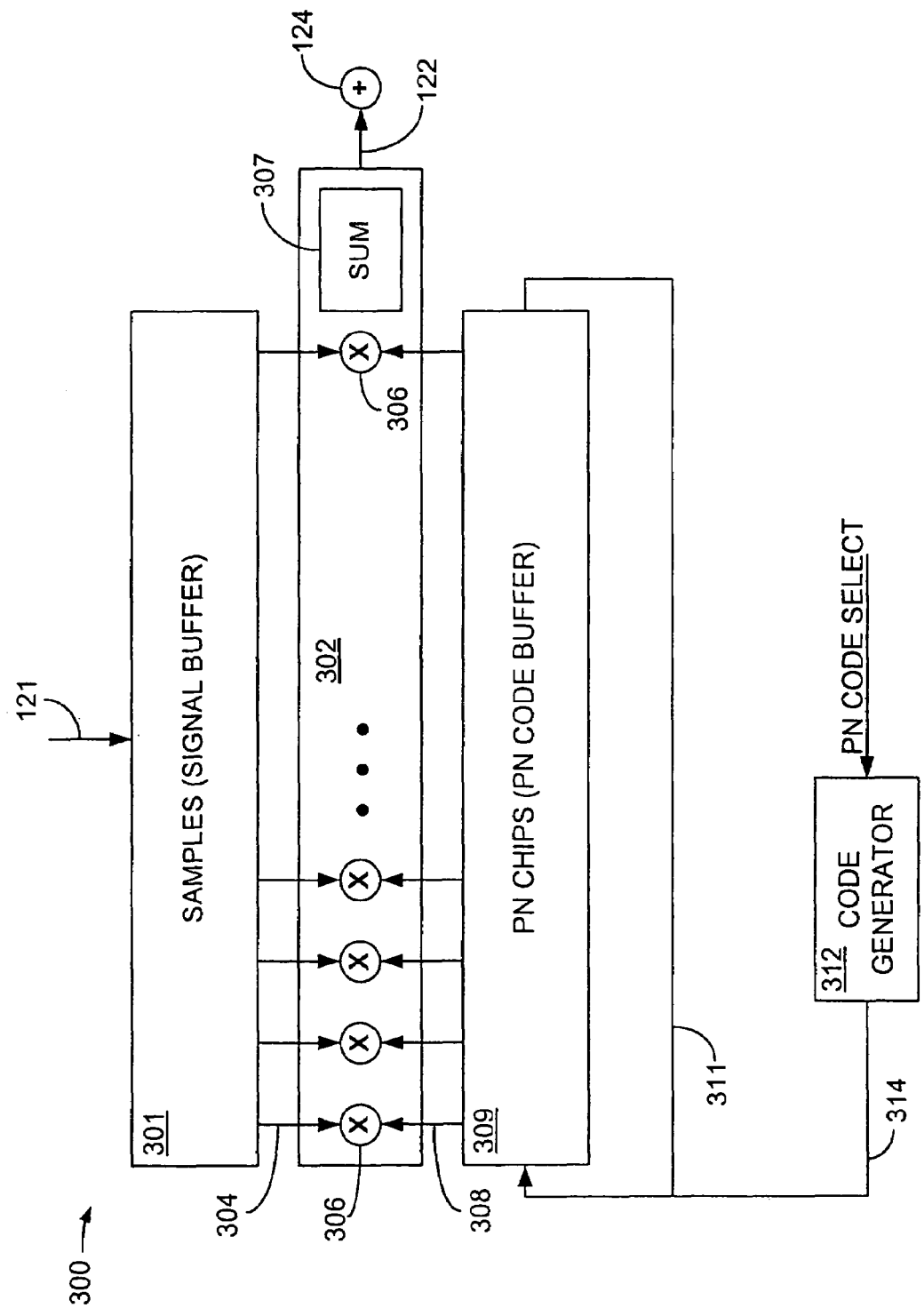
FIG. 4 is a block diagram illustrating the matched filter of FIG. 2.

With reference now to FIG. 4, shown is matched filter 300 of FIG. 2. In accordance with an aspect of the invention, matched filter 300 need only generate those code phases that are required to perform data detection of the data period 16 within satellite waveform 10 (FIG. 1).

Matched filter 300 includes signal buffer 301, which receives samples from data extraction element 220 of FIG. 3. Matched filter 300 also includes PN code buffer 309, which includes reference PN chips for the two or three code phases that are being analyzed by matched filter 300. Code generator 312 provides the PN code to PN code buffer 309 via connection 314. The code generator 312 provides the PN code required for the current operation and is responsive to microprocessor software. PN code buffer 309 is a circular buffer that rotates the PN chips through sections of the code buffer via feedback connection 311 as required to provide those code phase settings required for the current operation. Matched filter 300 also includes multiplication and integration circuitry 302. For example, each sample in signal buffer 301 is multiplied by a corresponding PN chip within PN code buffer 309 by multipliers 306. Essentially, multipliers 306 take the dot product between the received waveform (the samples within signal buffer 301) and the reference waveform (the PN chips within PN code buffer 309). These samples are taken over an appropriate period of time and then coherently integrated by integrator 307, resulting in one millisecond samples on connection 122. The signal on connection 122 is a complex number, which is represented by a one millisecond integration from matched filter 300. This one millisecond integration is supplied via connection 122 to adder 124 of FIG. 2.

Referring back to FIG. 2, the output of matched filter 300 on connection 122 is supplied to adder 124 and then via connection 126 to complex summation RAM 128. Complex summation RAM 128 includes a plurality of registers, two examples of which are illustrated as register 134 and register 136, containing respectively, a twenty millisecond integration of a first data period received from matched filter 300 and a twenty millisecond integration of a second data period received from matched filter 300. These two values are called data epoch 1 and data epoch 2, respectively. Complex summation RAM 128 integrates twenty of the one millisecond complex sums received from matched filter 300 via feedback loop 132 to provide a twenty millisecond coherent integration. This process is repeated for the second data period. As illustrated by the dotted line between matched filter 300 and adder 124, the functionality described above, and prior to adder 124, preferably occurs in hardware using specialized logic circuitry. The functionality described beginning with adder 124, and below, may occur in a microprocessor. However, the complex summation RAM 128 may also be implemented in hardware. Furthermore, the data detection circuit 100 may be implemented completely in either hardware or software.

Data epoch 1, contained within RAM register 134 and data epoch 2, contained within RAM register 136 represent the integrations of two adjacent twenty millisecond data periods for a given satellite. In operation, complex summation RAM 128 toggles between the data epoch 1 word contained in register 134 and the data epoch 2 word contained in register 136 for adjacent twenty millisecond periods so that at the end of any twenty millisecond period, complex summation RAM 128 has the integration that has just been completed and the integration that was completed twenty milliseconds prior thereto. This result is supplied as two different complex numbers via connections 129 and 131, respectively.

The complex number output on connection 129 represents the current twenty millisecond integration from complex summation RAM 128 and is represented by the value I+jQ. The output of complex summation RAM 128 on connection 131 is a complex number representing the previous twenty millisecond integration done within complex summation RAM 128 and is represented by the value I+jQ. An arctangent operation ($\tan^{-1}$) is performed on each of these signals in blocks 137 and 138, respectively, resulting in an angle ($\theta_n$) on connection 139 that represents the phase of the satellite waveform for the current twenty millisecond integration. The output of arctangent block 138 is also an angle $\theta_{n-1}$, representing the phase of the satellite waveform for the previous twenty millisecond integration. These two values on connections 139 and 141 are differenced in adder 142 resulting in an output $\Delta\theta$ on connection 144. In accordance with an aspect of the invention, the value $\Delta\theta$ is analyzed to determine whether or not a phase inversion has occurred at data epoch 15 of satellite waveform 10.

Figure 5:
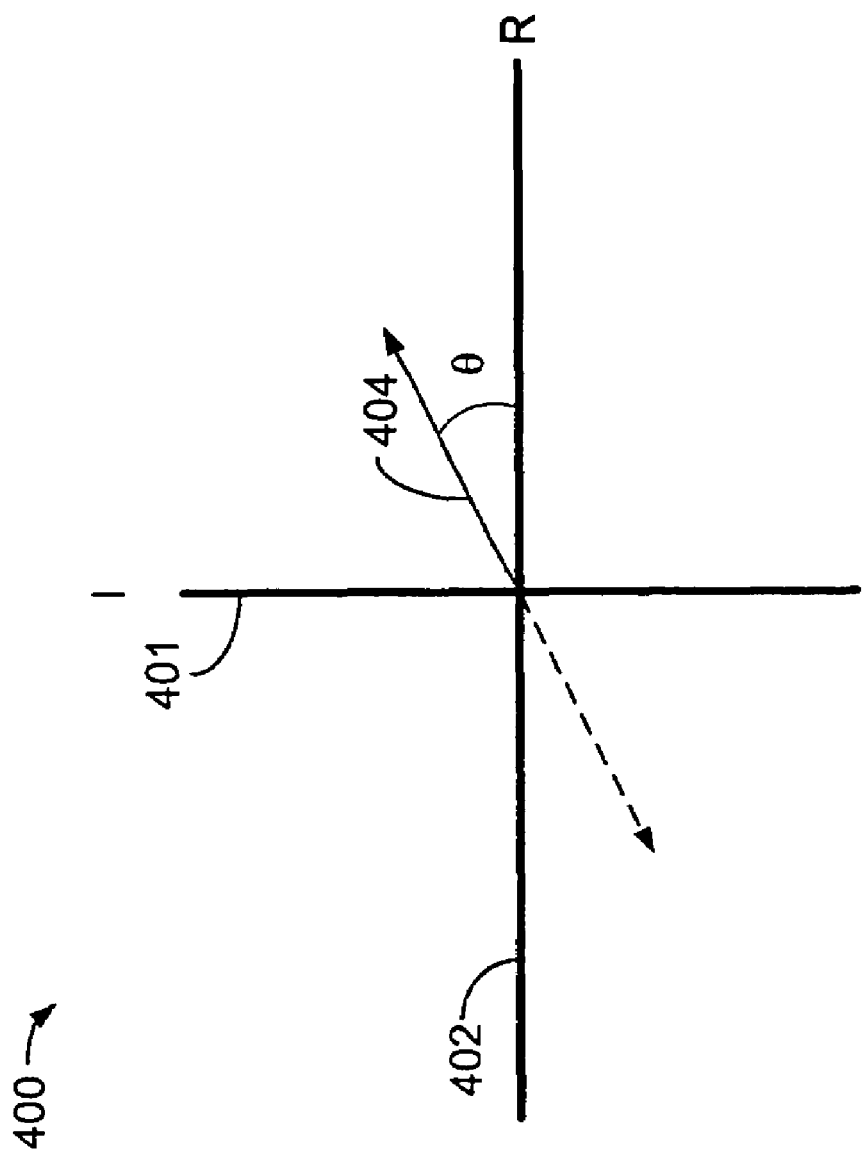
FIG. 5 is a graphical illustration representing a data epoch including a phase inversion.

FIG. 5 is a graphical illustration representing a data epoch 15 including a phase inversion. Graph 400 shows real axis 402 and imaginary axis 401. Signal vector 404 is shown at an angle ($\theta$) with respect to real axis 402. For each twenty millisecond integration, the value $\Delta\theta$ appearing on connection 144 of FIG. 2 is analyzed to determined whether or not it is greater than +90 degrees or less than −90 degrees. If the value Δθ exceeds these thresholds, then a phase inversion has taken place at data epoch 15.

Referring back to FIG. 2, data accumulator 146 accumulates this phase inversion information received from adder 142 and supplies as an output via connection 147 data frames which include the low frequency 50 Hz data from data period 16 of FIG. 1.

In accordance with another aspect of the invention, the output of adder 142 (the Δθ value on connection 144 after removing the effects of any detected 180 degree phase inversions due to data modulation) can be supplied to Doppler generator 117 (or 221 of FIG. 3) in order to control the value that Doppler generator 117 provides to mixer 119 (or 222 of FIG. 3). In this manner, Doppler generator 117 is supplied with the most accurate satellite Doppler information available. This connection would typically occur via a microprocessor controller.

Referring back to FIG. 2, the output of data accumulator 146 is represented in frames, which include a number of subframes. The subframes are constructed using code words from the waveforms received from each satellite. Each code word includes twenty-eight data bits and two parity bits. Typically, ten code words comprise a sub-frame and five sub-frames comprise a frame. A frame is typically thirty seconds and includes 1500 bits.

Figure 6:
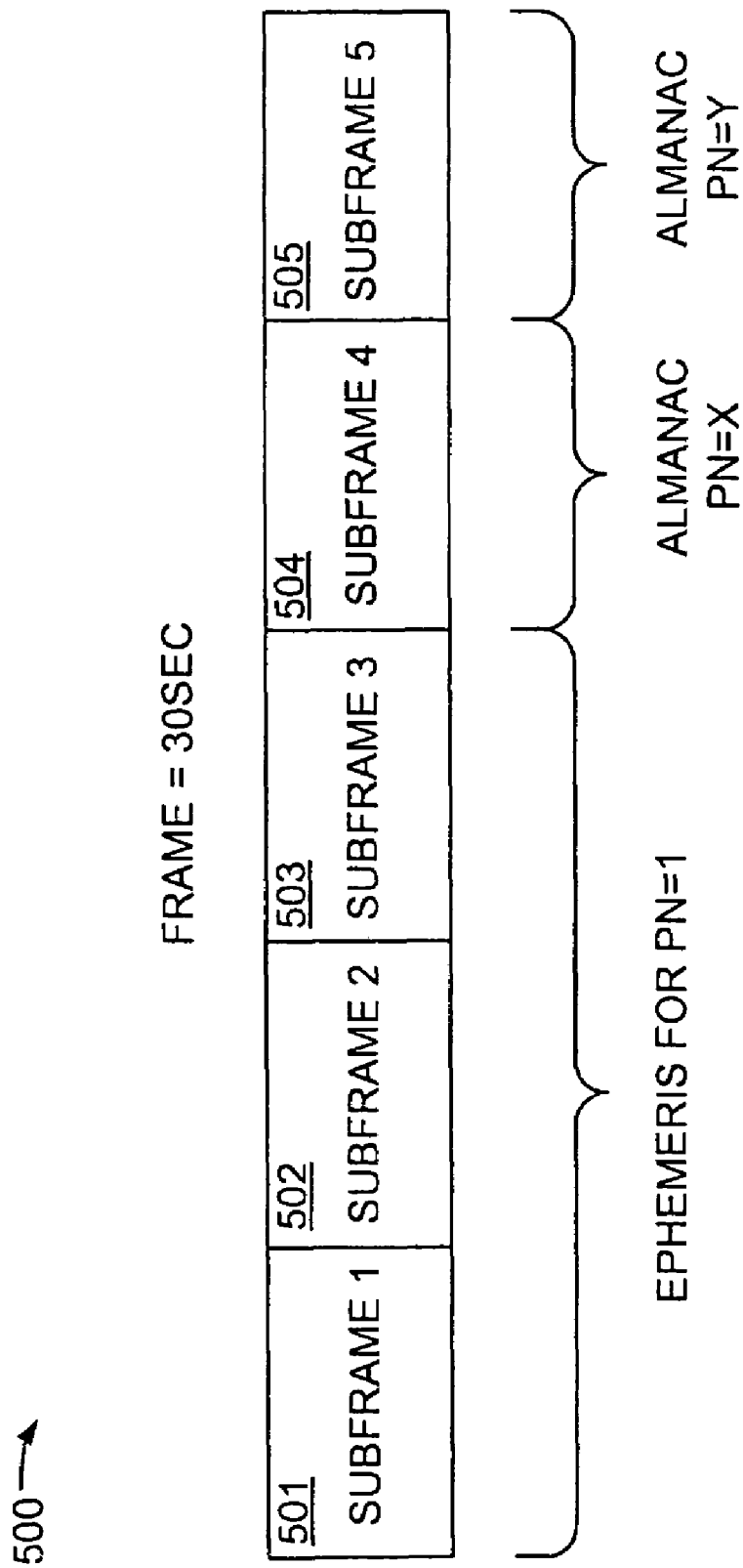
FIG. 6, is a block diagram illustrating a data frame constructed of data extracted from the satellite waveform of FIG. 1.

Referring now to FIG. 6, shown is a data frame 500 extracted from the satellite waveform of FIG. 1. Data frame 500 includes sub-frames 501 through 505. Sub-frames 501, 502 and 503 include the ephemeris data for the particular satellite whose signal has been received and decoded. The ephemeris data completely describes the location and characteristics of the satellite. Data frame 500 also includes sub-frame 504, which includes almanac data for a number of the different satellites in the GPS system and sub-frame 505, which includes almanac data for the balance of the different satellites in the GPS system. The almanac data is typically updated once per week, and can locate the satellite to within approximately one kilometer. The almanac information also allows calculation of the Doppler shift information. The ephemeris data contained in sub-frames 501, 502 and 503 as mentioned above, is specific to each satellite being received, and is a more precise version of the almanac data. The ephemeris data can locate the satellite to within a fraction of a meter, and is typically updated once per hour, although the ephemeris data is valid for up to four, and in some situations six, hours. By using the data detection circuit to quickly and efficiently detect and decode the 50 Hz data present in the satellite signal, energy consumed in the GPS receiver can be significantly reduced because of the low duty cycle operation. Using the matched filter 300 to detect data as well as acquire satellites and measure code phase for range estimation can also reduce circuit size.

OTHER EMBODIMENTS

The present invention can be implemented in the system described in U.S. Pat. No. 5,825,327, entitled "GPS Receivers And Garments Containing GPS Receivers And Methods For Using These GPS Receives," which is incorporated by reference.

U.S. Pat. No. 5,825,327 discloses a GPS receiver having multiple GPS antennas. Also described is a method of tracking employing the GPS receiver and a communication transmitter. Also described is a garment having a GPS receiver, a GPS antenna, a communication antenna, and a communication transmitter.

The present invention can be implemented in the system described in U.S. Pat. No. 5,945,944, entitled "Method And Apparatus For Determining Time For GPS Receivers," which is incorporated by reference.

U.S. Pat. No. 5,945,944 discloses a method and apparatus of determining the time for a global positioning system receiver. Timing signals derived from a communication system, such as cellular phone transmission signals, are received by a GPS receiver and decoded to provide accurate time information. The timing signals may be in the form of synchronized events marked by timing indicators, or as system time information. The timing signals in combination with satellite position signals received by the GPS receiver are used to determine the position of the GPS receiver.

The present invention can be implemented in the system described in U.S. Pat. No. 5,831,574, entitled "Method And Apparatus For Determining the Location OF An Object Which May Have An Obstructed View Of The Sky," which is incorporated by reference.

U.S. Pat. No. 5,831,574 discloses the following. A positioning sensor receives and stores a predetermined record length of positioning signals while in a fix position located such that the positioning sensor can receive positioning signals. Thereafter, the stored positioning signals rare processed to determine the geographic location of a the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with t depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,884,214, entitled "GPS Receiver And Method For Processing GPS Signals," which is incorporated by reference.

U.S. Pat. No. 5,884,214 discloses the following. A global positioning system (GPS) receiver has first circuitry for receiving and processing pseudorandom sequences transmitted by a number of GPS satellites. The first circuitry is configured to perform conventional correlation operations on the received pseudorandom sequences to determine pseudoranges from the GPS receiver to the GPS satellites. The GPS receiver also includes second circuitry coupled to the first circuitry. The second circuitry is configured to receive and process the pseudorandom sequences during blockage conditions. The second circuitry processes the pseudorandum sequences by digitizing and stoning a predetermined record length of the received sequences and then performing fast convolution operations on the stored data to determine the pseudoranges. The GPS receiver may have a common circuitry for receiving GPS signals form in view satellites and downconverting the RF frequency of the received GPS signals to an intermediate frequency (IF). The IF signals are split into two signal paths; a first of which provides the conventional correlation processing to calculate the pseudoranges. During blockage conditions, the IF signal is passed to the second signal path wherein the IF signals are digitized and stored in memory and later processed using the fast convolution operations to provide the pseudoranges. Alternative arrangements for the two signal paths include separate downconverters or shared digitizers. One embodiment provides both signal paths on a single integrated circuit with shared circuitry executing computer readable instructions to perform GPS signal processing appropriate to the reception conditions.

The present invention can be implemented in the system described in U.S. Pat. No. 5,874,914, entitled "GPS Receiver Utilizing A Communication Link", which is incorporated by reference.

U.S. Pat. No. 5,874,914 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 6,016,119, entitled "Method And Apparatus For Determining The Location Of An Object Which May Have An Obstructed View Of The Sky," which is incorporated by reference.

U.S. Pat. No. 6,016,119 discloses the following. A positioning sensor receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,781,156, entitled "GPS Receiver And Method For processing GPS Signals," which is incorporated by reference.

U.S. Pat. No. 5,781,156 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 5,841,396, entitled "GPS Receiver Utilizing A Communication Link," which is incorporated by reference.

U.S. Pat. No. 5,841,396 discloses the following. A precision carrier frequency signal for calibrating a local oscillator of a GPS receiver which is used to acquire GPS signals. The precision carrier frequency signal is sued to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a basestation via a communication link. The remote GPS receiver unit uses this satellite almanac data to determine approximate Doppler data for satellites in view of the remote GPS receiver unit.

The present invention can be implemented in the system described in U.S. Pat. No. 5,999,124, entitled "Satellite Positioning System Augmentation With Wireless Communication Signals," which is incorporated by reference.

U.S. Pat. No. 5,999,124 discloses a method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement which represents a time of travel of the SPS signals is also determined. A position of the SPS receiver is determined from a combination of at least the time measurement which represents the time of travel of a message in the cell based communication signals and from a time measurement which represents a time travel of the SPS signals. The cell based communication signals are capable of communicating data messages in a two-way direction in one embodiment between the cell based transceiver and the communication system.

The present invention can be implemented in the system described in U.S. Pat. No. 6,002,363, entitled "Combined GPS Positioning System And Communications System Utilizing Shared Circuitry," which is incorporated by reference.

U.S. Pat. No. 6,002,363 discloses a combined GPS and communication system having shared circuitry. The combined system includes an antenna for receiving data representative of GPS signals, a frequency converter coupled to the antenna, a frequency synthesizer coupled to the frequency converter, an analog to digital converter coupled to the frequency converter and a processor coupled to the frequency converter. The processor processes the data representative of GPS signals to determine a pseudorange based on the data representative of GPS signals to determine a pseudorange based on the data representative of GPS signals. The integrated communication receiver includes a shared component which is at least one of the antenna, the frequency converter, the frequency synthesizer and the analog to digital converter. Typically, in certain embodiments, the processor also demodulates communication signals received as well as controls the modulation of data to be transmitted as a communication signal through a communication link.

It will be obvious to those skilled in the art that many modifications and variations may be made to the preferred embodiments of the invention, as set forth above, without departing substantially from the principles of the invention. All such modifications and variations are intended to be included herein within the scope of the invention, as defined in the claims that follow.

What is claimed is:

1. A GPS receiver, comprising:

a radio frequency system receiving GPS signals from GPS satellites and providing digitized signals of a complex format derived from the GPS signals, wherein the GPS signal from each satellite comprises a spread spectrum modulated signal encoding a data signal, each bit of the data signal spanning a predetermined data epoch;

a digital memory including a plurality of buffers for storing the digitized signals, each buffer having a predetermined size to hold digitized signals received over a time period exceeding the predetermined epoch of the data signal, the digital memory organized such that, at any given time, the digitized signals in a first one of the buffers is made available for retrieval, while the digitized signals from the radio frequency system is received into a second one of the buffers; and a digital processor coupled to the digital memory, wherein the digital processor processes the digitized signals retrieved from the digital memory to provide a de-spreaded digitized signal, and wherein the digital processor further comprises data detection circuitry configured to decode the data signal from the de-spreaded over successive data epochs.

2. A GPS receiver as in claim 1, wherein the digital processor comprises a matched filter for detecting a time delay from the GPS signal of a GPS satellite representing a distance between the receiver and the GPS satellite.

3. A GPS receiver as in claim 1, wherein the data detection circuitry detects a phase shift in the data signal at a boundary between successive data epochs.

4. A GPS receiver as in claim 1, wherein the data detection circuitry integrates coherently the de-spreaded signal.

5. A GPS receiver as in claim 4, wherein the data detection circuitry further integrate non-coherently the integrated de-spreaded signal.

6. A GPS receiver as in claim 2, wherein the digitized signals are rotated in the digital processor prior to processing in the matched filter.

7. A GPS receiver as in claim 1, wherein the digital processor processes the digitized signals in the frequency domain using a Fourier transform.

8. A GPS receiver as in claim 7, wherein the Fourier transform is accomplished using a Fast Fourier Transform algorithm.

* * * * *